Sept. 25, 1962   L. J. NETZEL   3,055,205
CHIP-PER-TOOTH INDICATING SYSTEM
Filed Jan. 11, 1961

WITNESSES:
Bernard R. Gieguey
James F. Young

INVENTOR
Leonard J. Netzel
BY
Paul E. Friedemann
ATTORNEY

# United States Patent Office 3,055,205
Patented Sept. 25, 1962

3,055,205
CHIP-PER-TOOTH INDICATING SYSTEM
Leonard J. Netzel, Skokie, Ill., assignor to Westinghouse Electric Corporation, East Pittsburgh, Pa., a corporation of Pennsylvania
Filed Jan. 11, 1961, Ser. No. 82,001
5 Claims. (Cl. 73—7)

This invention relates to electric circuitry including indicating means for indicating the chip-per-tooth in a material cutting machine.

Electric circuitry and indicating means for the same general purpose of this invention have been heretofore proposed but such electric circuitry has not found general acceptance in the trade because of the use of electronic tubes providing expensive and not too reliable apparatus.

One broad object of this invention is the provision of a chip-per-tooth indicating system for a material cutting machine that is, with respect to prior art systems, either simpler, or more reliable, or cheaper, or have any combination of these characteristics.

Figure 1:
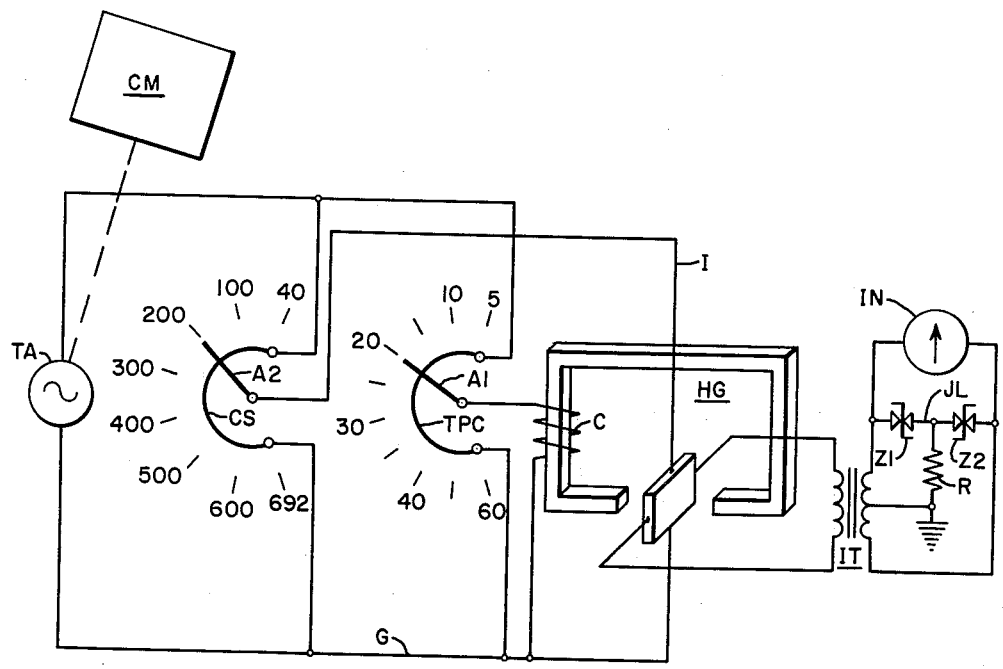
Figure 2:
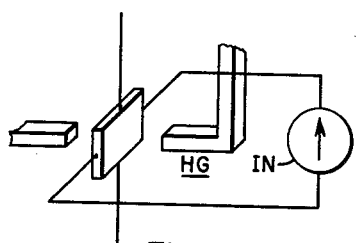

The objects recited in the preceding paragraph are merely illustrative. Other objects and advantages of this invention will become more apparent from a study of the following specification and the accompanying drawing, in which:

FIGURE 1 is a diagrammatic showing of this invention, when an alternating current tachometer is used; and FIG. 2 shows the indicator circuitry when the tachometer is of the direct current type.

On all types of metal, wood, plastics and other machineable materials it is necessary to maintain a certain chip load. The reasons for this are many. Two good reasons are, (1) to maintain maximum efficiency on the machining and (2) to protect the cutters from overloading which would cause breaking of the cutter or underloading which causes dulling of the cutters.

In the FIG. 1 CM represents the cutting machine whose cutters operate on some suitable machineable material. An alternating current tachometer TA is mechanically coupled to the cutting machine and thus has an output which is proportional to the cutter, or machine, speed. An indicator IN indicates chip-per-tooth loading of the machine.

To understand the circuitry shown in the FIG. 1 best, it is necessary to know that:

$$\text{Chip/tooth} = \frac{\text{Feed rate in inches per minute}}{\text{No. of teeth in cutter} \times \text{r.p.m. of cutter}}$$

From a study of FIG. 1 it is apparent that the feed rate, which is measured by means of a small A.C., or if necessary a D.C., tachometer TA, is divided by two other variables, namely the number of teeth in the cutter, and the r.p.m., or speed, of the cutter. The two variables in the denominator of the above noted expression are multiplied together by means of a Hall generator HG.

In the particular showing of the FIG. 1 an impedance matching isolation transformer IT is used. The inclusion of the transformer IT provides some refinements and improvements. If the sensitivity of the indicator, the chip-per-tooth instrument IN, is high and electrical noise is a problem, then the isolation transformer may have to be of the shielded type. The indicating instrument, when the transformer IT is not used, as when a D.C. tachometer is used, would be connected where the primary of the transformer is shown to be connected. This is shown in FIG. 2.

The magnetic flux for the Hall generator is provided by coil C connected at a selected point through arm A1 to the potentiometer TPC, representing teeth per cutter, and the ground lead G. The point of connection to the potentiometer TPC is, of course, made to match the number of teeth on the particular cutter used.

The current for the Hall generator is provided by leads I and G, with the lead I, through the arm A2, being connected at a selected point on the potentiometer CS representing cutter speed. The arm A2 is, of course, connected at a point to match the speed at which the cutter is being operated.

The Hall generator being thus supplied with inputs representing cutter speed and teeth per cutter and the feed rate being the frequency of the cycles supplied to the Hall generator, the chip-per-tooth is thus indicated at the indicator IN.

On an actual installation the scale range is graduated from 0 to 0.050 full scale which is quite liberal for the present day cutter design. The feed rate in this case varies from 1.29 to 129 inches per minute. This range too is usually sufficient for all types of machining operations. The number of cutters per cutting wheel, the diameter of the cutter, or cutting wheel and the cutter speed are as follows: (1) Number of cutters per wheel from 4 to 52 in increments of 2, (2) the cutter wheel diameter from 2 inches to 22 inches in increments of ½ inch per increment, and (3) the range of revolutions per minute from 40 to 692 r.p.m., with 1 r.p.m. increments from 40 to 100 r.p.m, and 3 r.p.m. increments from 100 to 690 r.p.m. Since the increments are quite small, multi-turn helipots are required to get the proper resolution.

Although specific numbers are included and they have sufficient range, the actual values and ranges can be changed to accommodate the possible differences in measured values required. That is, the diameter of the cutters may vary from 10 inches to 54 inches on a particularly large machine. This requires only slight basic component substitution and recalibration. The basic circuitry would remain as shown in the FIG. 1.

For the protection of the indicating instrument IN against over-voltage, or overcurrent, or both, one pair of Zener diodes Z1 connected back-to-back and another pair of Zener diodes Z2 also connected back-to-back are, through a junction lead JL, connected in series with each other but connected in parallel to the instrument across the secondary of the isolation transformer. A current limiting resistor R is connected between the junction lead JL and ground.

While but one embodiment has been shown and a simpler one suggested, the invention is not limited to the exact disclosure made but may be modified within the spirit and scope of this invention.

The claims are:

1. In an electric system for indicating the loading per cutter tooth for a material cutting machine, in combination, a cutting machine operating a cutter on a work piece, a source of voltage having a value that is a function of the feed rate of the cutter into the material, a Hall generator, means for producing a magnetic flux in said generator from said voltage that is a function of the number of teeth on the cutter, means for supplying a current to said generator from said voltage that is a function of cutter speed, and indicating means interconnected with the output of said Hall generator.

2. In an electric system for indicating the loading per cutter tooth of a machine for cutting a work piece, in combination, a cutting machine for operating a cutter on a work piece, a Hall generator, first means for supplying an input to the Hall generator as a function of cutter feed rate and cutter speed, second means for supplying an input to the Hall generator as a function of cutter feed rate and cutter characteristics, and indication means interconnected with the output of said Hall generator.

3. In an electric system for indicating the loading per cutter tooth of a machine operating a multitooth cutter on a work piece, in combination, a cutting machine having a multitooth cutter for operating said cutter on a work piece, voltage generating means coupled to said machine for producing a voltage output proportional to the feed rate of the cutter into the work piece material, a Hall generator, magnetic flux input producing means for said Hall generator comprising a coil energized in proportion to the combined effect of cutter feed rate and the number of teeth on the cutter, current input means for said Hall generator comprising means for producing a current proportioned to the combined effect of cutter feed rate and cutter speed, indicating means interconnected with the output of the Hall generator for indicating the Hall generator output which output is a function loading per cutter tooth.

4. In an electric system for indicating the loading per cutter tooth of a machine operating a multitooth cutter on a work piece, in combination, a cutting machine having a multitooth cutter for operating said cutter on a work piece, voltage generating means coupled to said machine for producing a voltage output proportioned to the feed rate of the cutter into the work piece material, a Hall generator, magnetic flux input producing means for said Hall generator comprising a coil energized in proportion to the combined effect of cutter feed rate and the number of teeth on the cutter, current input means for said Hall generator comprising means for producing a current proportioned to the combined effect of cutter feed rate and cutter speed, an impedance matching transformer having a primary winding and a secondary winding with the primary winding connected to the output of the Hall generator, indicating means interconnected with the secondary of said transformer for indicating the Hall generator output which output is a function loading per cutter tooth.

5. In an electric system for indicating the loading per cutter tooth of a machine operating a multitooth cutter on a work piece, in combination, a cutting machine having a multitooth cutter for operating said cutter on a work piece, voltage generation means coupled to said machine for producing a voltage output proportioned to the feed rate of the cutter into the work piece material, a Hall generator, magnetic flux input producing means for said Hall generator comprising a coil energized in proportion to the combined effect of cutter feed rate and the number of teeth on the cutter, current input means for said Hall generator comprising means for producing a current proportional to the combined effect of cutter feed rate and cutter speed, an impedance matching transformer having primary windings and secondary windings with the primary windings being connected to the output of said Hall generator, indicating means interconnected with the secondary of said transformer for indicating the loading per cutter tooth, and a Zener diode connected across said indicating means.

No references cited.